(12) United States Patent
Woodman et al.

(10) Patent No.: US 8,731,240 B1
(45) Date of Patent: May 20, 2014

(54) SYSTEM AND METHOD FOR OPTICS DETECTION

(75) Inventors: Doug Woodman, Palo Alto, CA (US); Stephen Sheldrake, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 686 days.

(21) Appl. No.: 12/851,484

(22) Filed: Aug. 5, 2010

(51) Int. Cl.
| G06K 9/00 | (2006.01) |
| G06K 9/46 | (2006.01) |
| G06K 9/66 | (2006.01) |
| G06K 9/50 | (2006.01) |
| G06K 9/62 | (2006.01) |
| G06K 9/36 | (2006.01) |
| G06K 9/32 | (2006.01) |

(52) U.S. Cl.
USPC ........... 382/103; 382/106; 382/154; 382/190; 382/195; 382/201; 382/224; 382/284; 382/291; 382/294

(58) Field of Classification Search
None
See application file for complete search history.

(56) References Cited

U.S. PATENT DOCUMENTS

| 3,967,122 | A * | 6/1976 | Ashe et al. .................... 250/367 |
| 6,369,755 | B1 * | 4/2002 | Nichols et al. ............ 342/357.52 |
| 8,010,316 | B2 * | 8/2011 | Maltseff ........................ 702/159 |
| 2007/0116333 | A1 * | 5/2007 | Dempski et al. .............. 382/128 |
| 2008/0100510 | A1 * | 5/2008 | Bonthron et al. ............. 342/373 |
| 2008/0316026 | A1 * | 12/2008 | Yenisch et al. ................ 340/555 |
| 2009/0018445 | A1 * | 1/2009 | Schers et al. .................. 600/437 |

FOREIGN PATENT DOCUMENTS

EP         1515162 A1 *  3/2005  ............. G01S 17/88

OTHER PUBLICATIONS

"SLD500 Surveillance and Snipers Detection System", Cilas Presentation 2007, SLD500 specification overview, p. 1, 25-27.*
"SLD500 Sniper Locator CILAS", Defense Update, International online defense magazine, 2006, Issue 2, page downloaded http://defense-update.com/products/s/SLD500.htm.*
"SLD500 Surveillance and Snipers Detection System", Cilas Presentation 2007, SLD500 specification overview, p. 1,25-27.*
"SLD500 Sniper Locator CILAS", Defense Update, International online defense magazine, 2006, Issue 2, page downloaded http://defense-update.com/products/s/SLD500. htm.*
Mirage 1200™ and Beam 1000™, Product Spec Sheet, Torrey Pines Logic, Feb. 17, 2011.
SKD 500 Surveillance and Sniper Detection Laser System, Product Spec Sheets, Cilas, Aug. 2007.

* cited by examiner

*Primary Examiner* — Thomas Conway
(74) *Attorney, Agent, or Firm* — McDermott Will & Emery LLP

(57) ABSTRACT

An optics detection system is disclosed. The optics detection system includes a sensor module and a processor. The sensor module is configured to illuminate a field of regard with a plurality of light pulses and to capture reflections of the plurality of light pulses in a plurality of frames, respectively. The processor is configured to process the plurality of frames to locate and identify optics within the field of regard using a plurality of discriminators.

28 Claims, 11 Drawing Sheets

SYSTEM AND METHOD FOR OPTICS DETECTION

STATEMENT REGARDING FEDERALLY SPONSORED RESEARCH OR DEVELOPMENT

Not applicable.

BACKGROUND

1. Field

The present disclosure generally relates to optical signal processing and, in particular, relates to detection and identification of optical systems through analysis of reflected signals.

2. Description of the Related Art

Soldiers in combat situations have long since faced the danger of snipers firing from concealed locations. Finding a sniper can be difficult even once the sniper has fired, given that a sniper may be 200-1200 meters away. This is even more difficult in urban battlefields where locating the source of a shot by ear is hampered by the echoes of the shot and the high level of background noise. Fixed encampments are susceptible to a sniper attack at any time. The preferred solution for anyone in hostile territory is to identify the presence of a sniper before they fire their first shot.

Several companies have produced sniper detection systems based on acoustic detection of the bullet's passage through the air or the muzzle blast of the rifle. These are only effective after the shot is fired, however, and offer no capability to detect surveillance by hostile forces prior to an attack or hostile forces that are monitoring a roadside bomb to trigger it when it can do the most damage.

Several companies have also produced sniper detection systems based on optical detection of the lenses of surveillance binoculars or rifle scopes. In some systems, a laser is reflected by optical systems to a receiver, whereupon an operator manually assesses the threat.

Disadvantages of the current approaches include a slow rate of scanning the environment, where it can take several minutes to scan a 120 degree sector, and the use of only the intensity of the reflection to identify possible threats which leads to a high percentage of false warnings. In assessing potential threats manually, it may be difficult for an operator to identify an observer or sniper who may be well camouflaged. In addition, there may be a lag of several minutes between the detection of a potential threat and assessment of the threat by the operator, leaving personnel within the protected area at risk during this delay.

SUMMARY

This disclosure describes the design and operation of an optics detection system that will protect a large area. The system includes an optical sensor that sends out a series of pulses of polarized light as it scans continuously around the entire area two times per second. Overlapping images taken as the optical sensor rotates provide multiple interrogations of each potential threat. The availability of multiple measurements of the reflection from a single potential threat, coupled with optical filtering that reduces ambient optical noise and range gating that eliminates signals that are too close to be real threats, improves the ability of the system to categorize the identity of the potential threat. The system measures a number of parameters, such as peak intensity, intensity profile, image size, image shape, polarization contrast ratio (Ico−Icross)/(Ico+Icross), and movement from sweep to sweep, to differentiate between potential threat optics and false targets such as reflective signs, taillights, headlights, etc.

According to certain configurations, an optics detection system is disclosed. The optics detection system includes a sensor module configured to illuminate a field of regard with a plurality of light pulses and to capture reflections of the plurality of light pulses in a plurality of frames, respectively, and a processor coupled to the sensor module, the processor configured to process the plurality of frames to locate and identify optics within the field of regard based on a plurality of discriminators.

According to certain configurations, a method of detecting optics within a field of regard is disclosed. The method includes the steps of illuminating a field of view with a plurality of light pulses, the field of view covering a portion of the field of regard, capturing reflections of the plurality of light pulses from within the field of view in a plurality of frames, respectively, and processing the plurality of frames to locate and identify optics within the field of view using a plurality of discriminators.

According to certain configurations, an optics detection system is disclosed. The optics detection system includes a sensor module having a field of view and configured to rotatably scan a field of regard, a base station comprising a display, a communication module configured to communicate with the sensor module, and a processor coupled to the communication module and the user interface. The processor is configured to receive via the communication module the selected portions of the frames and the position and orientation of the sensor module, process the plurality of frames to identify optics based on a plurality of discriminators, and display the distance and direction and the type of optics via the display. The plurality of discriminators includes two or more of the set of peak intensity, spatial distribution of intensity, image size, image shape, image symmetry, image pattern, and polarization ratio. The sensor module comprises an illuminator configured to illuminate the field of view with a plurality of light pulses having a frequency band and a polarization, an aperture configured to accept light from within the field of view, a spectral filter configured to remove light outside of the frequency band of the plurality of light pulses, a prism configured to separate the reflections of the plurality of light pulses and form a first image that is co-polarized with the polarization of the plurality of light pulses and a second image that is cross-polarized with the polarization of the plurality of light pulses, a camera system, a position determination device configured to determine the position of the sensor module, and an orientation determination device configured to determine the compass direction orientation of the sensor module field of view. The camera system is configured to temporally filter the reflected light to ignore reflections coming from objects outside of a defined range of distances, capture the co-polarized and cross-polarized images in a plurality of frames, pre-process the plurality of frames to select portions of the frames containing reflections within the field of regard for further processing, and transmit the selection portions of the frames. The sensor module further includes a communication module coupled to the camera system, the position determination device, and the orientation determination device, and configured to transmit the selected portions of the frames and the position and orientation of the sensor module. The base station includes a display, a communication module configured to communicate with the sensor module, and a processor coupled to the communication module and the user interface. The processor is configured to receive via the communication module the selected portions of the frames and the position and orientation of the sensor module, process the plurality of frames to identify optics based on a plurality of discriminators wherein the plurality of discriminators includes two or more of the set of peak intensity, spatial distribution of intensity, image size, image shape, image symmetry, image pattern, and polarization ratio, display the distance and direction and the type of optics via the display.

According to certain configurations, a computer-readable medium having computer-executable instructions stored thereon for execution by a processor to perform a method of detecting optics is disclosed. The method includes illuminating a field of view with a plurality of light pulses, the field of view covering a portion of the field of regard, capturing reflections of the plurality of light pulses from within the field of view in a plurality of frames, respectively, and processing the plurality of frames to locate and identify optics within the field of view based on a plurality of discriminators.

In the following description, specific configurations are described to show by way of illustration how the invention may be practiced. It is to be understood that other configurations may be utilized and changes may be made without departing from the scope of the present invention.

DETAILED DESCRIPTION

To overcome at least some of the disadvantages of existing sniper detection systems listed above, there is a need for a system that scans the entire perimeter of an area in a very short amount of time, scans continuously, and identifies potential threats with a high degree of confidence. The optics detection system of the present application overcomes at least some of these limitations and provides an elevated level of protection.

Providing protection for people against hostile attack is a difficult and complex task. Whether the people at risk are military personnel in a war zone or civilians, such as the President of the United States, the first line of defense is to identify anyone who is observing the subject group from a distance. The possibility that a sniper may fire accurately from a distance of up to 1200 meters and take aim within a matter of seconds makes it desirable to keep the surrounding area under constant surveillance.

Figure 1:
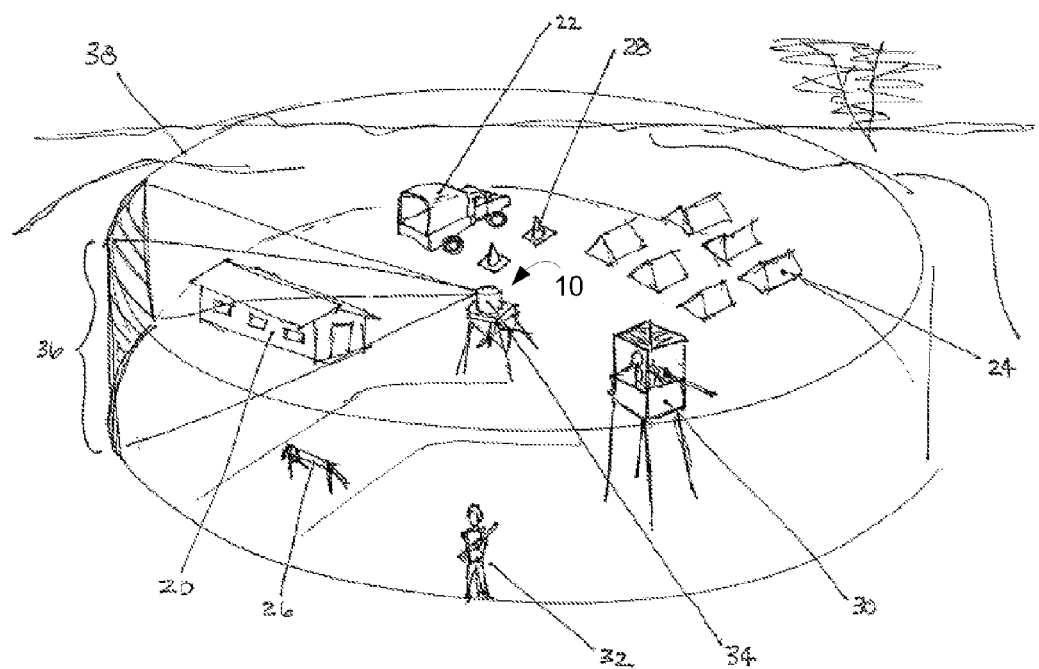
FIG. 1 illustrates an optics detection system deployed according to certain aspects of the present disclosure.

FIG. 1 illustrates an optics detection system 10 deployed according to certain aspects of the present disclosure. In this example, a military Forward Operating Base is shown that may include buildings 20, vehicles 22, tents 24, traffic barricades 26, traffic cones 28, and other infrastructure. Many of these objects may have reflective surfaces such as window glass, license plates, or reflective tape. An elevated guard tower 30 provides a basic level of observation and protection to the camp. The elevation and visibility, however, expose the soldiers in the tower to sniper attack from a distance. Sentries 32 and other soldiers positioned on the ground have a limited field of view.

The central tower is an exemplary configuration of an optical sensor 34 mounted on an elevated platform to give it a clear view of the entire perimeter of the camp. The optical sensor 34 contains a camera with a field of view 36 covering a portion of the field of regard 38 that, in this example, is the entire 360 degree perimeter around the camp. The optical sensor 34 rotates continuously to cover the entire perimeter 38 of the camp. In certain configurations, a complete rotation takes half a second. By taking a series of overlapping pictures as it rotates, sensor 34 provides continuous observation of the entire perimeter 38. The images from sensor 34 are passed to a base station (not shown) that may be collocated with the sensor or located in building 20 or other location within the camp. The base station may include an audible alarm. In other configurations, the optical sensor 34 may be mounted on a truck or other mobile platform. In other configurations, the optical sensor 34 may scan a field of regard in azimuth and elevation. In other configurations, the optical sensor 34 may be set up to observe a stationary field of view. In other configurations, a portion of the optics detection system 10 may be integrated into a unit that may resemble a pair of binoculars comprising both optical sensor 34 and a display.

The images are processed in the base station to identify potential threats around the camp. In some configurations, the image processing may identify whether the potential threat is a pair of binoculars, a camera, or a sniper scope. If a potential threat is identified, signals may be sent to the guard tower 30 and sentries 32 or other personnel that provide the location of the potential threat relative to the individual recipient of the signal. This information may include, for example, a distance and compass bearing as well as the type of optics detected. The soldiers may have small computers that may provide secure communication with the optics detection system, provide location information of the soldier to the optics detection system, and provide visual or audible information, such as an audible alarm, to the soldier. The soldiers may have binoculars that are equipped with magnetic north sensors to facilitate observations in the specific direction provided by the optics detection system.

Figure 2:
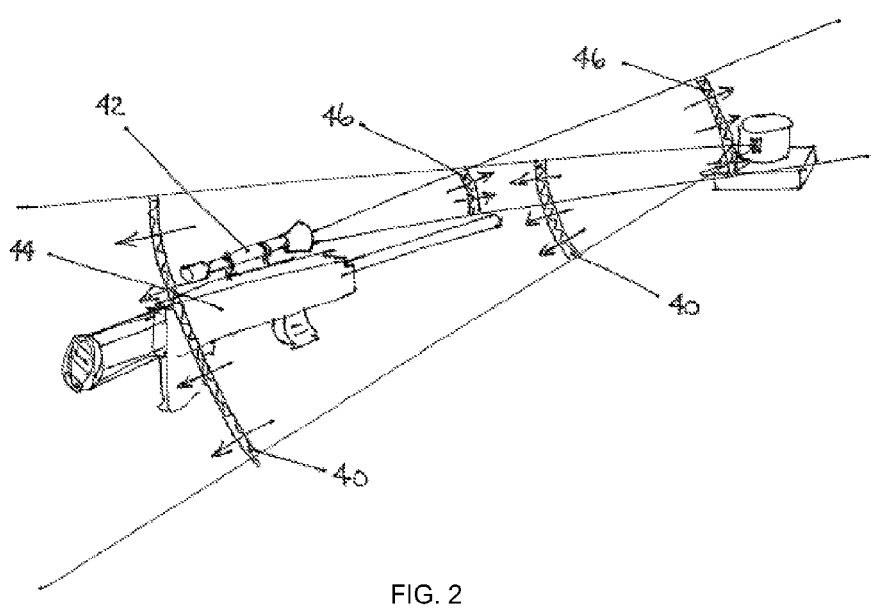
FIG. 2 illustrates how the optical sensor projects a beam of light pulses and receives reflections from the scope of a rifle according to certain aspects of the present disclosure.

FIG. 2 illustrates how the optical sensor 34 projects a beam of light pulses 40 and receives reflections 46 from the optics 42 of a rifle 44 according to certain aspects of the present disclosure. While a rifle scope is used as an example of threat optics in the figures herein, this is only one example of threat optics which also may include binoculars, monocular spotting scopes, cameras, camcorders, and rangefinders. As sensor 34 rotates, it sends out a series of light pulses 40 of a duration that may be 1-4 microseconds. The light pulses reflect from all objects in the field of illumination according to their material and surface characteristics. Polished and coated optics, such as the high-power scopes typically used with sniper rifles, are highly reflective compared to most other objects. If the optics are pointed in the general direction of the optical sensor 34, typically within a few degrees of sensor 34, a high intensity reflection 46 is created. This angle would cover an area of approximately 120 meters in diameter when viewed from a distance of 900 meters. These reflections 46 are captured as an image by the optical system of sensor 34. By using a light source having a high Pulse Repetition Frequency (PRF) and a camera having a correspondingly high frame rate, the short intensifier gate time compared to the rotational speed of sensor 34 makes these images essentially stationary in a manner similar to the flash of a normal camera set at a fast shutter speed for "stop action" photography. At least one new image is captured for each pulse 40.

Figure 3:
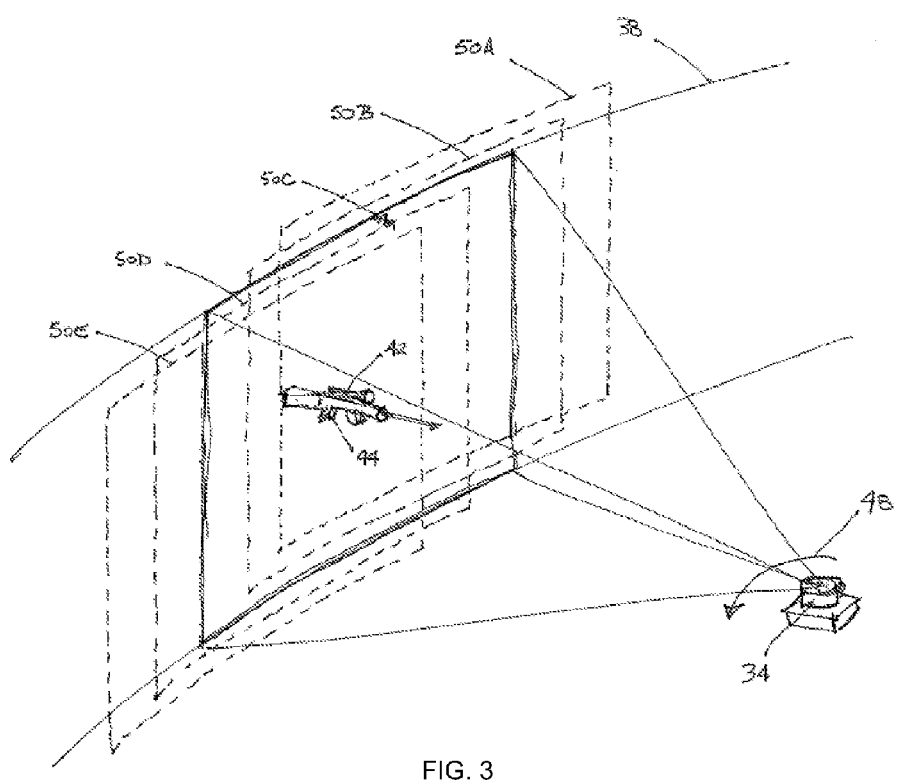
FIG. 3 illustrates how the overlapping images taken by the optical scanner provide multiple scans of the optics attached to a rifle according to certain aspects of the present disclosure.

FIG. 3 illustrates how overlapping images 50A-50E taken by the optical scanner 34 provide multiple scans of the optics 42 attached to a rifle 44 according to certain aspects of the present disclosure. Optical sensor 34 is rotating in the direction shown by arrow 48, projecting light pulses at regular intervals as it scans the perimeter 38 shown in FIG. 1. Each light pulse is reflected and captured as an image by sensor 34. In this example, the outline 50A shows an example field of view of sensor 34 when the first pulse is projected. When the next light pulse is projected, sensor 34 has rotated and the field of view for the second pulse is 50B. Subsequent light pulses create images 50C, 50D, and 50E. It can be seen that the optics 42 are within all five fields of view 50A-50E.

The height and width of the fields of view in this illustration, such as 50C, are only one configuration. In certain configurations, the field of view may have a fixed vertical angle that can be adjusted upward, to cover tall buildings for example, or downward, to protect a hilltop camp for example. In certain configurations, a 10 degree vertical field of view may provide satisfactory coverage. The aspect ratio of the field of view is shown as having a greater width than height. In certain configurations, a narrow width field of view may be preferable. In certain configurations, a 2 degree horizontal field of view may provide satisfactory coverage.

The image field of optical sensor 34 may also be mapped to exclude portions of the field of view, either continuously or for selected positions in orientation. For example, a building that is within the field of view over a portion of the rotation of optical sensor 34 may be mapped to ignore signals from the regions in which there is no possibility of having a threat optic.

Figure 4A:
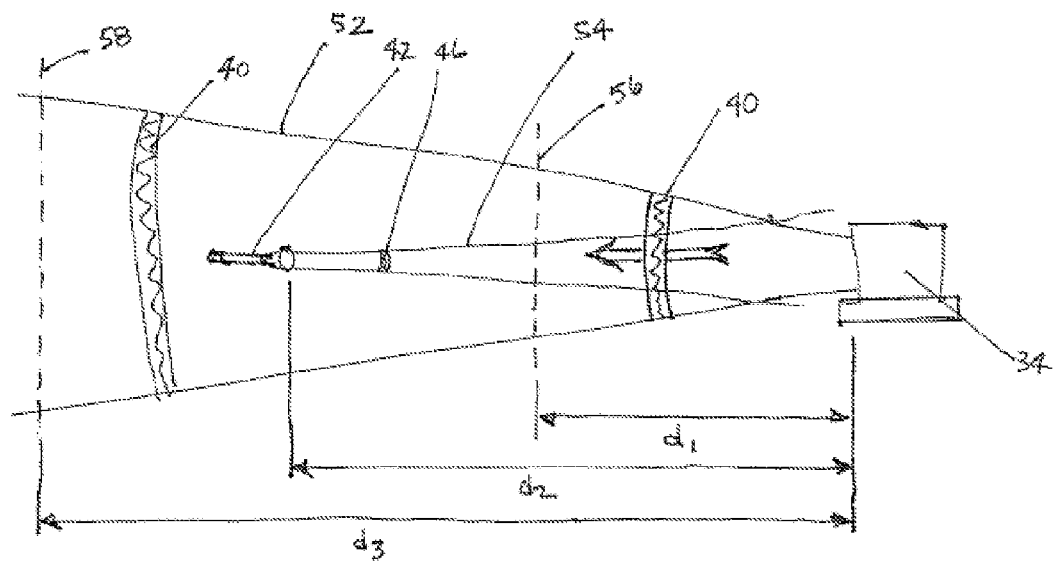
FIGS. 4A-4B illustrate how gating of the received signal can control the detection distances according to certain aspects of the present disclosure.
Figure 4B:
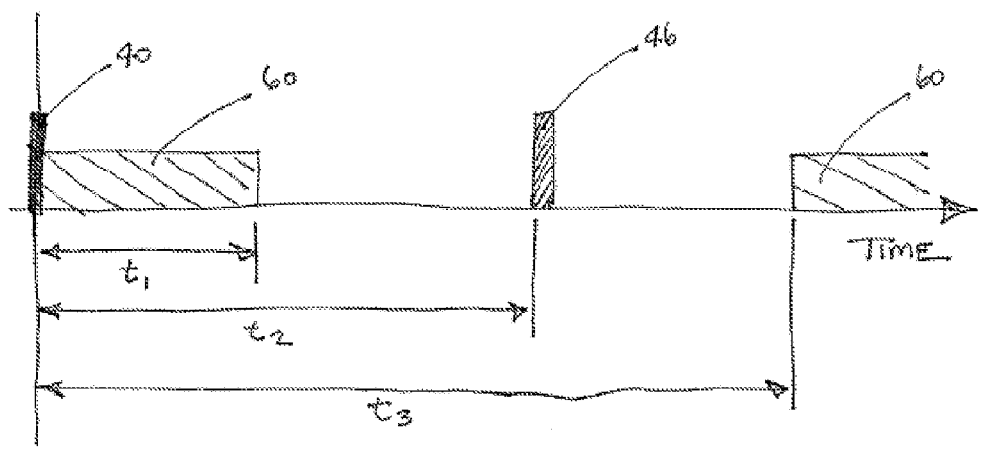

FIGS. 4A and 4B illustrate how gating of the received signal can control the detection distances according to certain aspects of the present disclosure. FIG. 4A is a side view of optical sensor 34 projecting light pulses 40 with a vertical field of view 52. Threshold 56, at a distance $d_1$, is the minimum distance for which this example system will sense threats. This distance may be the perimeter of the camp shown in FIG. 1. Use of a minimum distance such as this minimizes the potential for in-camp sources of false threats. There is, in this example, a maximum threshold 58 is established at a distance $d_3$, which may be related to the effective distance of the system. Thresholds 56 and 58 together determine the detection range limits for the optics detection system. This gating may be accomplished with an optical shutter in the camera system, which may be implemented by turning the intensifier 74 of FIG. 5 on and off, or electronic gating of the signal from the camera. Threat optics 42 is shown within the detection range limits at a distance $d_2$. Reflections 46 have their own angle of return 54 which will cover sensor 34 as long as the optics are pointed generally towards the sensor 34 within the angle of return 54.

FIG. 4B shows a sensor detection timeline associated with the physical configuration of FIG. 4A. A light pulse 40 is projected at time zero. The sensor ignores (shown as block 60) signals for a time $t_1$, which is the time that it takes light to travel the minimum distance $d_1$ and return. The sensor then captures any reflections 46 returning from objects within the detection range limits, and records their arrival time $t_2$. After time $t_3$, which is the time that it takes light to reach the far threshold 58 and return, sensor 34 again ignores signals until the next light pulse 40 is projected. This selective capture of reflections 46 may be accomplished through a shutter that blocks the reflected light, electronic gating of the signal from the camera, or software processing of the signals. The time period between $t_1$ and $t_3$ may be divided and captured as multiple images to quantify the distance $d_2$.

Figure 5:
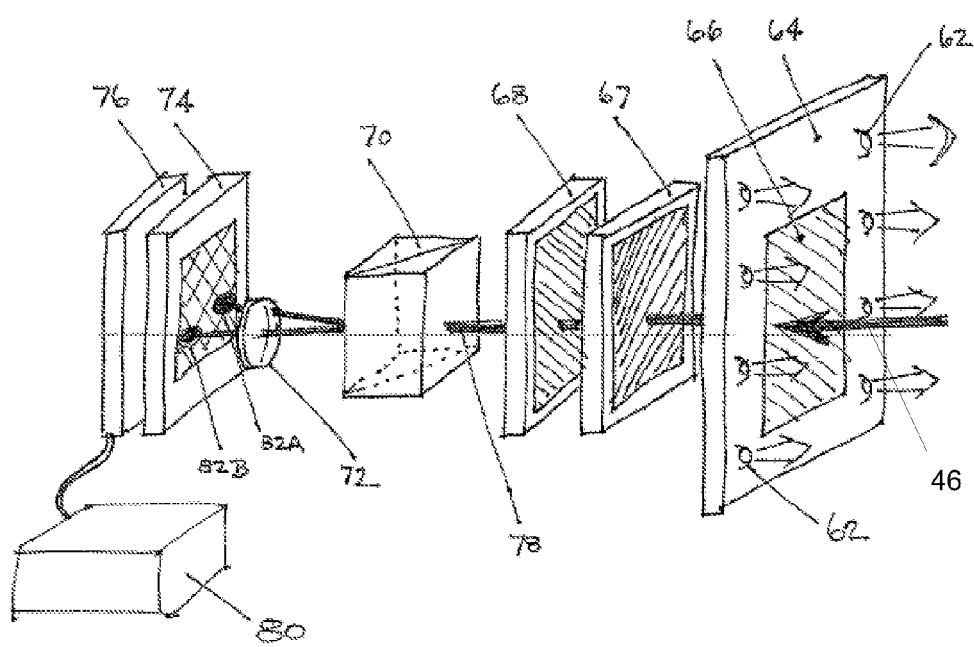
FIG. 5 is an exemplary configuration of the optical system of the optical sensor according to certain aspects of the present disclosure.

FIG. 5 is an exemplary configuration of the optical system 74 of the optical sensor 34 according to certain aspects of the present disclosure. Illuminator 64 includes multiple illuminator lasers 62, eight in this example, and provides the polarized light pulses 40. The light projected by the illuminator lasers 62 is limited to a narrow frequency band, the band preferably within the range of 0.3 nanometers to 2 micrometers. The choice of frequency may be based on available technology, the visibility of the beam by a person directly in the beam, and detectability by the target. The individual illuminator lasers 62 are spatially separated and include their own optics to create an overlapping pattern of areas within the designated field of view, such that a substantial portion of the field of view is illuminated by more than one of the individual light emitting devices 62. This redundant illumination reduces fading of return signals caused by of atmospheric turbulence and differences in the spatial intensity patterns normal to the retroreflected beam. The example illuminator lasers are laser diodes emitting polarized light but other types of illuminator lasers and separate polarizing elements (not shown) may be used in other configurations. The frequency of the projected light may be selected to optimize detection of certain types of target optics. This may be accomplished with variable-frequency illuminator lasers or swappable illuminators having illuminator lasers of different frequencies.

The power of the illuminator 64 is a balance between range, which requires higher power, and the minimum safe distance for nearby personnel, which limits the power. An example illuminator may emit a composite pulse having an energy of 200 microjoules and a Nominal Ocular Hazard Distance (NOHD) of approximately 2 meters. The spatial separation of the light-emitting devices generates a wider beam that reduces the maximum intensity of the illumination beam, thereby reducing the NOHD compared to a narrower beam of equal power. Other power levels and NOHD values may be acceptable based on configuration and deployment.

Reflections 46, with reference to FIG. 4A, enter the optical system 74 through an aperture 66 which determines the amount of retroreflected power received. The reflection 46 passes through a shutter 67 which protects the sensor in the event that the sensor is inadvertently pointed directly at the sun. The light then passes through a filter 68 that passes frequencies in a band around that of the illuminator 64 and absorbs light outside of this band. If the bandwidth of the projected light is very narrow, for example a bandwidth of a few nanometers, and the filter transmission band is similarly narrow, the filter may reduce the solar background noise by orders of magnitude.

The reflections then pass through, in this example, a Wollaston prism 70 which separates the light based on its polarization. Depending on how the light was reflected, some portion of reflection 46 will have retained the polarization of the original pulse 40 while the remaining light will be randomly polarized. A Wollaston prism separates an incoming beam of light, which may have a mixed polarization, into two outgoing beams of polarized light where the polarization of one beam is 90 degrees from the other beam. The intensity of the two beams, in this example of a Wollaston prism, is a function of how much of pulse 46 was reflected with the same polarization as the light emitted by the light-emitting devices 62, referred to as "co-polarized," and how much was reflected at 90 degrees, referred to as "cross-polarized". The ratio of the intensity of the co-polarized light to the intensity of the cross-polarized light is called the "polarization ratio." Polished and coated optics, such as the high-power scopes typically used with sniper rifles, tend to reflect most of the light as co-polarized, resulting in a high polarization ratio. Certain types of false targets such as plastic reflectors used on automobiles reflect light into almost equal polarizations at some wavelengths. Non-optical surfaces tend to reflect most of the incident light with mixed polarization, and the intensity of the two output beams from the Wollaston prism 70 will have approximately equal intensities and a low polarization ratio.

The two beams coming out of the Wollaston prism 70 pass through optics 72, shown in FIG. 5 as a single lens but may be a more complicated optical assembly with multiple transmissive and/or reflective elements. Optics 72 focus the two beams into images 82A and 82B on intensifier 74. The images are intensified and passed to an optical detector 76, such as a Complementary Metal Oxide Semiconductor (CMOS) image sensor. The detector 76 captures the intensity map of the images 82A and 82B as a digital image which the camera electronics 80 transfer into internal memory.

Figure 6A:
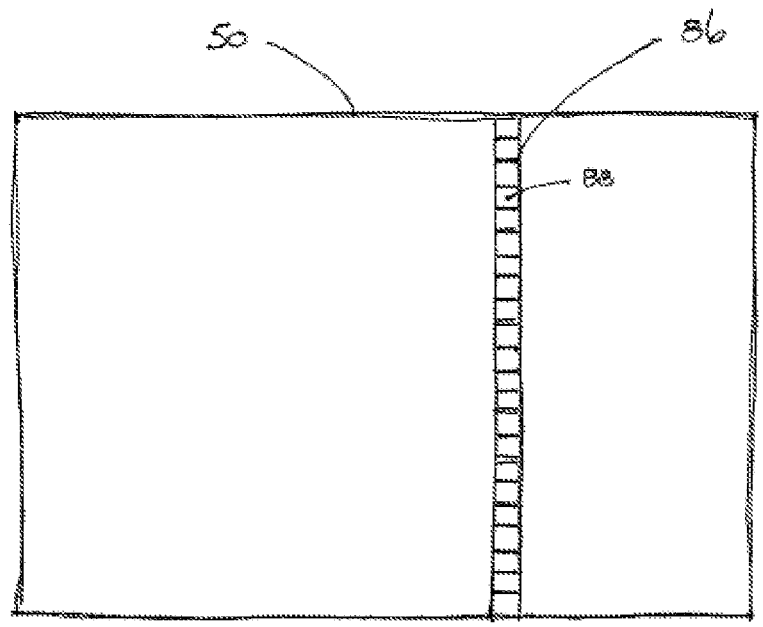
FIGS. 6A-6C illustrate how fast preliminary processing identifies areas of the image for further processing according to certain aspects of the present disclosure.
Figure 6B:
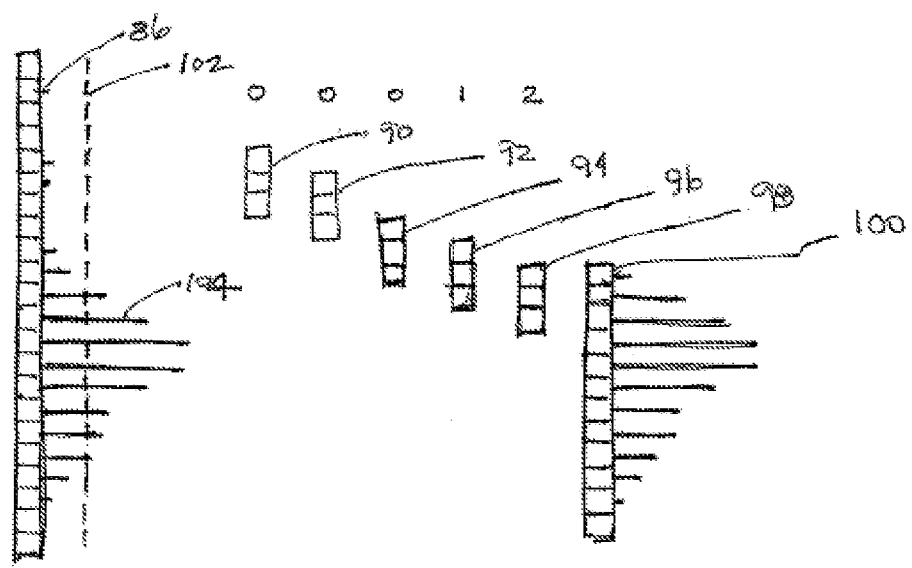

FIGS. 6A and 6B illustrate how preliminary processing identifies areas of the image for further processing according to certain aspects of the present disclosure. As the optical sensor may capture images at a rate in excess of 1000 images/second, there is a significant challenge in processing the full image for all these images in real-time. The disclosed system reduces the amount of processing required to enable this real-time performance through pre-processing and pixel strip reports as explained below.

FIG. 6A shows an example field of view 50, with reference to the fields of view 50A-50E shown in FIG. 3, viewed as one of the images formed on detector 76. The individual pixels 88 are grouped into strips, shown in this example as a vertical strip 86 composed of a single row of pixels 88. FIG. 6B illustrates an exemplary configuration of how the strip 86 is pre-processed. Strip 86 is repeated at the left of FIG. 6B as a reference, with the intensity of each pixel 88 shown as a horizontal bar 104 extending out from the pixel 88. Sets of 3 pixels 88 are selected starting from the top of strip 86. The pre-processor compares the intensities 104 of the 3 pixels to a threshold value, shown as the dotted line 102 next to strip 86. If one or zero pixels 88 have intensities 104 that exceed the threshold 102, the pre-processor discards this set and increments the set down the strip 86 by one pixel 88. A single high-intensity pixel is likely to be a solar spike and not associated with a potential threat. Set 90 is the fifth set evaluated for strip 86, shown in horizontal alignment with the pixels of strip 86 that are part of set 90, and the "0" above set 90 reflects that zero of the pixels 88 in set 90 have an intensity 104 greater than threshold 102. Similarly, sets 92 and 94 also have zero pixels above threshold 102. Set 96 has one pixel with an intensity 104 above threshold 102, as indicated by the "1" above set 96. This still is within the "one or zero" criteria for action by the pre-processor, so set 96 is discarded. Set 98, however, has two pixels with intensities 104 above threshold 102 and therefore the pre-processor does not discard this set. Instead, the pre-processor creates a "strip report" 100 comprising, in this example, the three pixels of set 98 and the next nine pixels. Strip report 100 is shown with the intensities of each pixel 88 repeated from strip 86 at the left. It can be seen that the nine pixels added to set 98 contain a large number of pixels with intensities 104 above the threshold 102. This pixel strip report is sent from the pre-processor to the main processor for further analysis. This pre-processing can be done very fast as it is a simple threshold comparison. The benefit is that this pre-processing extracts only high-intensity features for more-complex image analysis, reducing the overall time that it takes to process an image and enabling the system to detect threat in real-time while scanning at a speeds on the order of 2 revolutions per second. This pre-processing may also be implemented as horizontal strip evaluation or other sub-frame evaluation of pixel intensities against a threshold value.

Figure 6C:
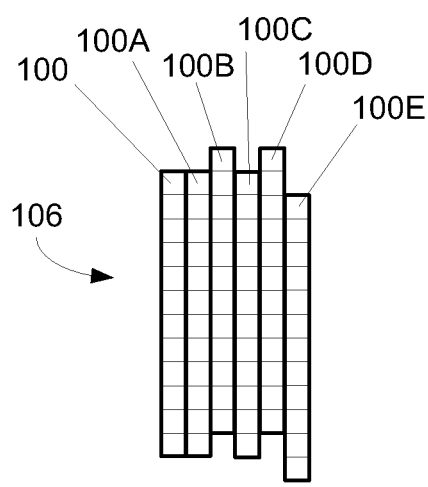

In FIG. 6C, strip report 100 has been assembled with adjacent strip reports 100A-100E to form a two-dimensional subframe 106. This subframe 106 is analyzed in detail by the main processor according to certain embodiments of the present disclosure. As the total area of this subframe 106 is a fraction of the area of the total image, the processing requirements are reduced an equivalent amount. This enables the full processing of the subframes 106 to be performed in real time.

Figure 7A:
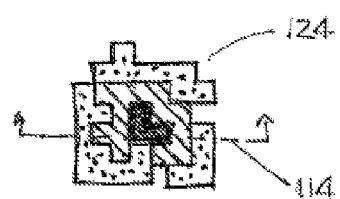
FIGS. 7A-7D show how the intensity profile of an image may be evaluated to differentiate optics from reflective surfaces according to certain aspects of the present disclosure.
Figure 7B:
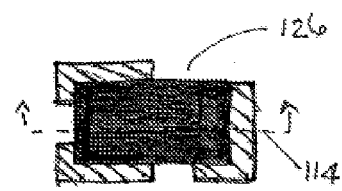
Figure 7C:
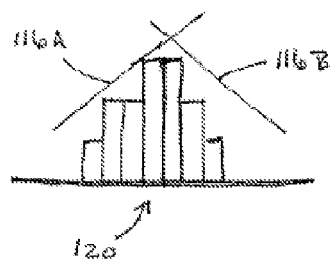
Figure 7D:
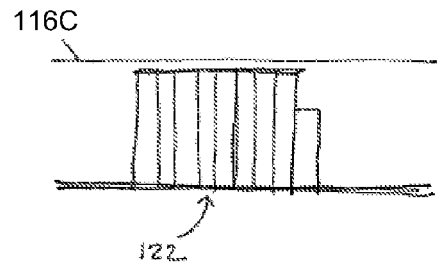

FIGS. 7A and 7B show how the intensity profile of an image may be evaluated to differentiate optics from reflective surfaces according to certain aspects of the present disclosure. FIG. 7A depicts an evaluation line 114 across, in this example, a horizontal strip of pixels 88. The intensities 104 of the pixels 88 are plotted as a bar graph 120 in FIG. 7C, where the vertical axis is the intensity and the horizontal axis is the pixel. The bar graph 120 shows a peaked shape, with the highest intensity in the middle dropping away on both sides. Slopes 116A and 116B can be calculated from this distribution of intensities 104. FIG. 7B shows a pattern 126 that is typical of a flat reflective surface, such as a road sign coated with a reflective paint. The intensity along the same evaluation line 114 is plotted in bar graph 122 in FIG. 7D. This intensity distribution is approximately flat, as shown by slope 116C. The sloped distribution created by a retroreflective optical system and the flat distribution created by flat reflectors enables further discrimination between true threat optics and other high-intensity signals that are not associated with threats.

The peak intensity of an image such as image 124 in FIG. 7A may be an important discriminant in identifying true threats, particularly in combination with the range estimate provided by the time delay of the reflection signal from the illumination pulse (time $t_2$ in FIG. 4B is the time that light takes to travel to a target at distance $d_2$ in FIG. 4A and return to the detector). A range-dependent threshold value can be used to provide a more accurate assessment of the reflectivity of potential threats, compared to prior art systems where the brightness is the only parameter used to identify potential threats.

Additionally, the size of the image can be used to identify potential threat optics. Depending on the detection range limits of the system, a maximum image size can be established based on the physical size of the largest possible optics at the minimum range. This would enable the exclusion of reflective items such as signs and building windows which produce much larger images that threat optics. A minimum size can also potentially be established based on the smallest optics at the maximum range as well as the resolution of the optics of the optical sensor 34. If the size of the image is, in this example, based on the black and striped intensity blocks, the image 124 of FIG. 7A has a width of 5 pixels and height of 4 pixels. Compare this to the example image 126 of a sign reflection of FIG. 7B, which has a size of 9 pixels wide and 6 pixels high. If the size were based on solely the black pixels, the comparison would be 2 pixels for FIG. 7A to 8 pixels of FIG. 7B. An example would be a minimum threshold size such as a 4×4 grid of pixels with a minimum specified intensity.

Figure 8A:
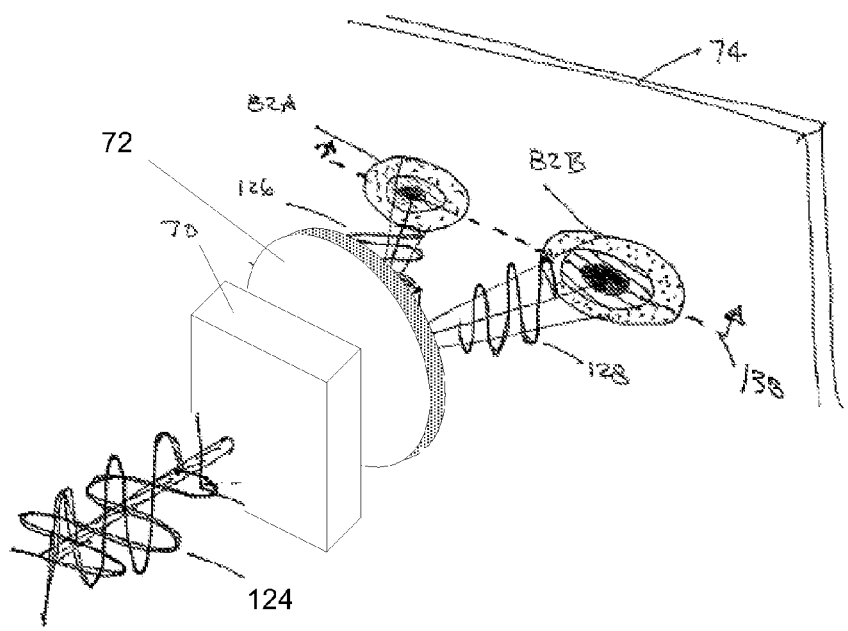
FIGS. 8A-8B illustrate how a prism can be used to measure the polarization ratio according to certain aspects of the present disclosure.
Figure 8B:
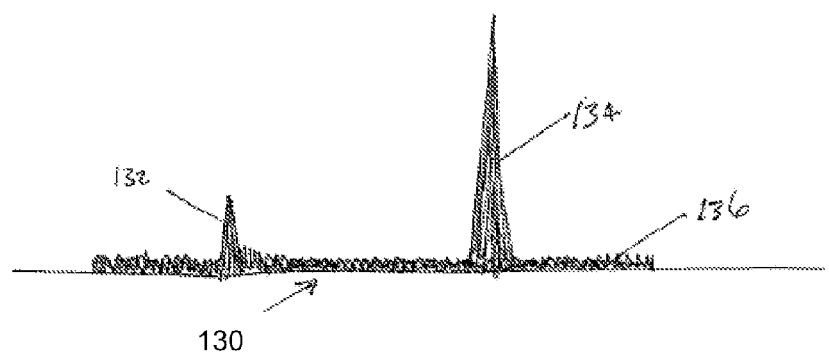

FIGS. 8A and 8B illustrate how a Wollaston prism 70 can be used to measure the polarization ratio according to certain aspects of the present disclosure. The incoming beam of reflected light 124 may contain components that have a variety of polarizations, represented in this drawing by the overlapping sine waves at right angles to each other in beam 124. A Wollaston prism 70 has the optical effect or separating light based on its polarization, producing two output beams 126 and 128. In this example, beam 126 is shown with horizontal polarization and beam 128 is shown with vertical polarization, represented by the horizontal and vertical sine waves in the respective beams. After passing through the focusing optics 72, the two beams form individual images 82A and 82B on intensifier 74 and equivalent images, of greater intensity, on detector 76 (not shown).

Plot 130 of FIG. 8B illustrates an example of the relative intensities 130 and 134 of the two images 82A and 82B, respectively, as measured along line 138 of FIG. 8A. In this example, the projected light pulse 40 has a polarization that is aligned with Wollaston prism 70 such that beam 128 is co-polarized and beam 126 is cross-polarized. The peak values of 130 and 134 can be compared to generate the polarization ratio. The polarization ratio of this example is well above 1:1, as may be associated with light reflected from an optic. Comparing the polarization ratio to a threshold value improves the ability to discriminate between threat optics and high-intensity non-threat reflections.

Figure 9:
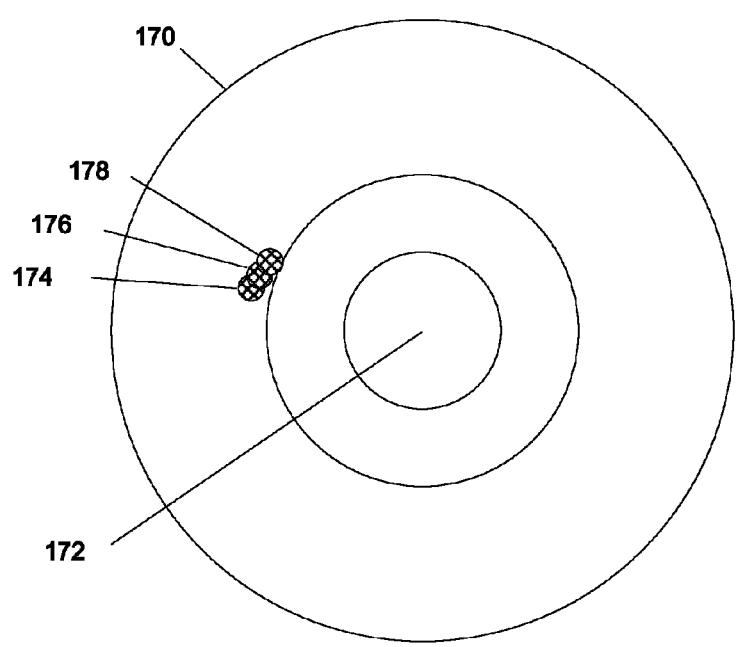
FIG. 9 illustrates an example display showing motion of a potential threat optic according to certain aspects of the present disclosure.

FIG. 9 illustrates an example display showing motion of a potential threat optic according to certain aspects of the present disclosure. Every time a new image is captured, the pre-processor sends strip reports 100 which are assembled into the 2D images 106, which are analyzed to identify potential threats. The angular position of these images is also tracked, which enables an image to be tracked across the multiple sequential images using the knowledge of the angle of the image and the position of the image within the field of view. The images of potential threats can be stored with their location in a list or database and compared to subsequent observations of the same potential threat as shown in FIG. 9. Display 170 is a projection of potential threat optics in the area surrounding the optical sensor 34 of FIG. 1, which is located at the center 172 of projection 170. In this example, a potential threat optic was detected on a first scan at position 174. In subsequent scans, the threat optic is identified as being the same threat optic as at 174 based on one or more of position and the plurality of discriminators, and the new positions of two subsequent scans are identified as positions 176 and 178. The amount and speed of motion of a potential threat optic may be additional discriminators. This list or database can be updated with each new image taken by the optical sensor 34. Other processes such as age-screening of potential threats can be performed and potential threats dropped from the list or database if they are no longer observed by the optical sensor 34.

Figure 10:
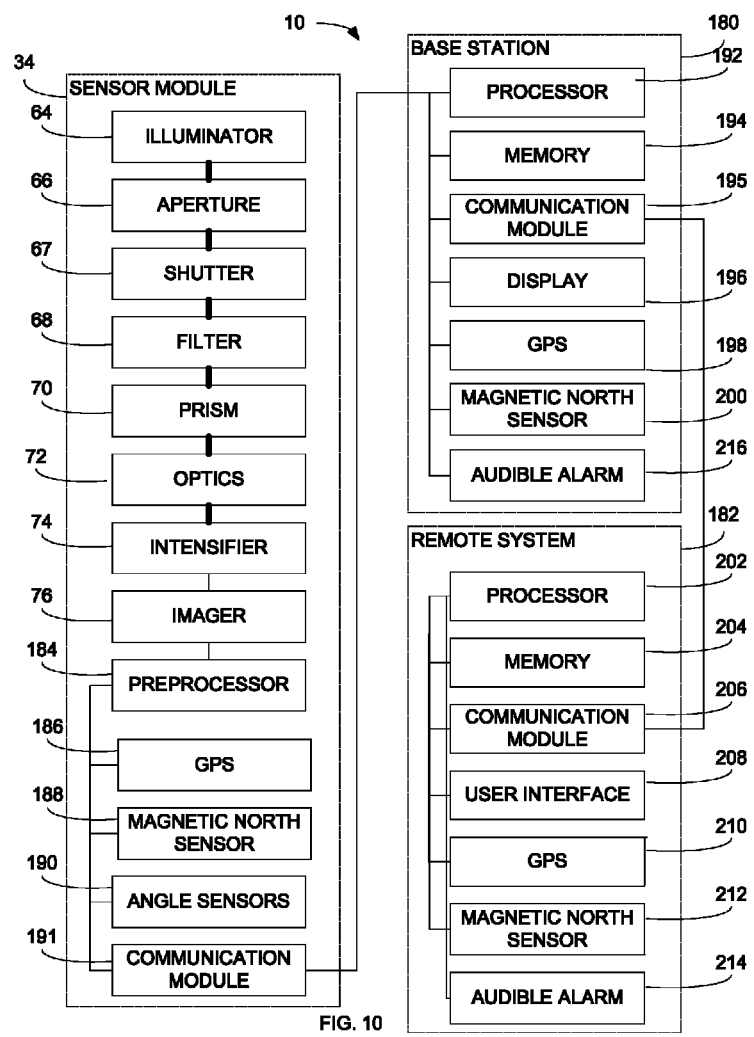
FIG. 10 is a block diagram of an example optics detection system according to certain aspects of the present disclosure.

FIG. 10 is a block diagram of an example optics detection system 10 according to certain aspects of the present disclosure. The optics detection system 10 comprises a sensor module 34, a base station 180, and a remote system 182 and may be implemented with additional elements or without some of the elements shown herein. Functions of the various elements disclosed may be accomplished in other blocks or via other methods without departing from the scope of the claims. The sensor module 34 comprises a series of items that are connected optically that includes the illuminator 64, aperture 66, shutter 67, filter 68, prism 70, optics 72, and intensifier 74. Shutter 67 may be one or more of a mechanical shutter or an electro-optic shutter, and may be located in other locations or as part of other blocks. Gating of the retroreflected signal may be accomplished by manipulation of the intensifier 74, software gating in preprocessor 184, or other method. Filter 68 may be implemented in one or more elements that filter some portion of the electromagnetic spectrum. The prism 70 may be implemented as one or more of a Wollaston prism or an alternate optical separation element, including beam splitters and partially silvered mirrors. The optics 72 may include focusing elements as well as apertures and filters and may comprise transmissive or reflective elements. The intensifier 74 may accomplish one or more of image intensity increase, spectral shifting, filtering, or magnification. The output of the intensifier 74 is coupled to imager 76 which may be implemented as a CMOS digital imager or other image capture device. The output of the imager 76 is coupled to a preprocessor 184 that is further coupled to a position determination device, shown in this example as a GPS 186, an orientation determination device, shown in this example as a magnetic north sensor 188, and angle sensors 190 that determines the angle of the sensor module 34 line-of-sight relative to the magnetic-north reference, and a communication module 191.

The base station 180 comprises a processor 192 coupled to a memory 194, communication module 195, a display 196, a position determination device, shown in this example as a GPS 198, and an orientation determination device, shown in this example as a magnetic north sensor 200. The communication link from sensor module 34 to base station 180 is shown in this example from communication module 191 to processor 192. Base station 180 may include an audible alarm 216. In other configurations, this communication link may be implemented between different modules of either system. The functions of preprocessor 184 and processor 192 may be accomplished in either device, including the elimination of processing from either device.

Remote system 182 may be carried by individuals in the field, a fixed observation post, or other remote site. Remote system 182 may comprise a processor 202, memory 204, communication module 206, a user interface 208, a position determination device, shown in this example as a GPS 210, and an orientation determination device, shown in this example as a magnetic north sensor 212. In this example, the base station 180 is linked to the remote system 182 between communication modules 195 and 206 although this may be implemented in other configurations. User interface 208 may comprise a visual display, an audio output, a vibratory output, a keyboard, a camera or other video input, and a microphone. Remote system 182 may include an audible alarm 214.

Figure 11:
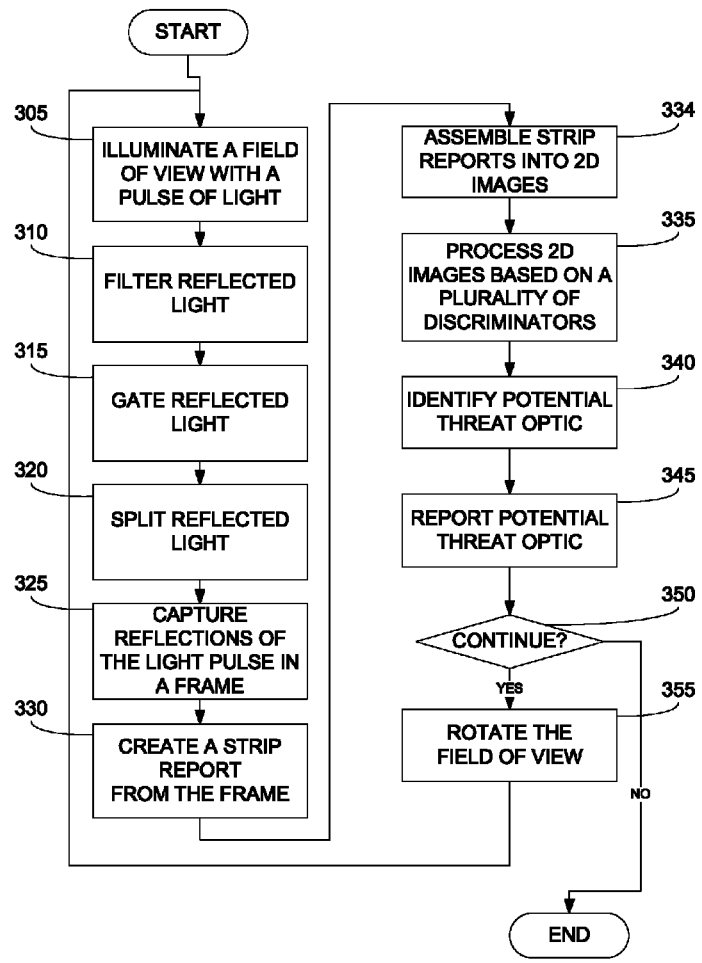
FIG. 11 is a flowchart illustrating an example method of detecting threat optics according to certain aspects of the present disclosure.

FIG. 11 is a flowchart illustrating an example method of detecting threat optics according to certain aspects of the present disclosure. In step 305, a field of view is illuminated with a pulse of light that may be polarized or have a defined bandwidth. Reflections of this light are filtered in step 310, which may include spectral filtering over one or more portions of the electromagnetic spectrum. In step 315, the reflected light is gated to reject light reflected from one or both of less than a minimum distance or more than a maximum distance. This gating may alternately be accomplished in other steps. The reflected light is then split in step 320 to separate, in this example, co-polarized from cross-polarized light. This light is then imaged and captured in step 325 in one or more frames that may capture temporally separated reflections. These frames are analyzed in step 330 to generate strip reports, when two of three adjacent pixels have exceeded a predetermined threshold, that comprise segments of the frames for further processing. This step may be eliminated in some configurations having sufficient processing power in a single device to process the entire frame. In this example, the strip reports are assembled into two-dimensional images in step 334 that are then evaluated in step 335 using a plurality of discriminators. The results of this processing are evaluated in step 340 and both non-threat targets and potential threat optics are identified. Information such as position, a confidence value, and other parameters based on the discriminators is reported in step 345. This reporting may include visual and audible output as well as data stored in a memory. At decision point 350, the process may be terminated or may continue to step 355 wherein the sensor module 34 is rotated and the process repeated from step 305. The rotation of sensor module may be equivalent to a partial width of the field of view such that the new field of view overlaps the previous field of view.

As has been disclosed herein, the subject optics detection system uses a number of elements of design and signal processing to identify potential threats that are using optical instruments to observe a protected area and automatically differentiate true threat optics from non-threat reflective objects and personnel. Use of a narrow frequency band of illumination light coupled with narrow band filtering can reduce the solar background noise, while shuttering can eliminate false signals from within the protected area and from areas beyond threat range. Combined use of multiple independent measurements of an image of a potential threat coupled with the availability of multiple measurements per rotation and additional sets of measurements within fractions of a second make it possible to provide a high confidence differentiation between threats and reflective non-threat objects. The independent measurements may include one or more of the following discriminants:

peak intensity
polarization ratio
image size
image shape (aspect ratio)
image intensity distribution (sloped vs. flat)

In addition, comparison of multiple measurements taken during a single rotation and between sets of measurements taken during sequential rotations enable detection of patterns associated with certain optics, and detection of motion of potential threats.

In summary, the present application discloses a optics detection system that provides continuous interrogation of the entire field of regard with no interruption. The system locates optical systems that may be used in surveillance and attack and automatically provides high-confidence discrimination between false signals and true threats. Spatial and spectral filtering are employed to reduce the background noise and occurrence of false signals. The system combines multiple independent measurements, based on the reflection characteristics of the optics of concern, to differentiate between reflective non-threats and true threats. Information can be transmitted to soldiers concerning the type and relative distance and direction of the threat, based on knowledge of the location of the soldier and the optical sensor.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "some" and "multiple" refer to one or more. Pronouns in the masculine (e.g., his) include the feminine and neuter gender (e.g., her and its) and vice versa. Headings and subheadings, if any, are used for convenience only and do not limit the invention.

Computer or processor readable media includes any physical device or material capable of storing data in a non-transient machine-readable format that can be accessed by an automated sensing device including Random Access Memory (RAM), Read Only Memory (ROM), Programmable ROM (PROM), Erasable PROM (EPROM), rotating magnetic hard disks, solid-state memory (SSD), flash memory data storage devices including "thumb drives" and flash cards such as Secure Digital (SD) cards and Memory Sticks, optical disks including Compact Disks (CDs) and Digital Video Disks (DVDs), magnetic stripes, removable magnetic media such as Zip and Jaz drives, magnetic tape, magnetically or optically scannable images including Magnetic Ink Character Recognition (MICR) characters, barcodes and two-dimensional matrix codes, or any other suitable storage device.

The terms "light" and "optical" are not limited to the spectrum of electromagnetic radiation visible to the human eye. Unless specifically stated otherwise, the terms "light" and "optical" and other similar terms may apply to any band of wavelengths within the range of 10 nanometers to 300 micrometers covering the ultraviolet to infrared spectrums.

The deployment and utilization of this system is particularly suited for a military operation in hostile territory where an enemy force may attack, and wherein the users of the system are soldiers. It should be understood that this system may be deployed in other situations wherein the personnel to be protected may be members of the U.S. or foreign governments or other civilians. Furthermore, the users may be other government security personnel such as the Secret Service or Federal Bureau of Investigation (FBI) or private security staff providing protection. As such, the use of the terms "user", "observer", or "soldier" should be understood to include any military or civilian personnel providing security or operating the subject system.

While the system is particularly suited for the detection of snipers and hostile observers, it should be understood that the terms "threat" and "sniper" and such may include binoculars or cameras or other optical systems that dangerous or non-dangerous observers may be using to observe activities that are desired to be kept secret or private, and that "protection" includes the prevention of this observation.

The term "remote" is used herein to describe the location of personnel and equipment as separated from the location of the optical sensor and/or base station. It should be understood that there is no implication on what distance separates the personnel and equipment from the optical sensor or base station. Additionally, there is no implication on the relative locations of the optical sensor and base station, which may be essentially co-located or separated by a significant distance.

It is understood that the specific configurations disclosed are illustrations of exemplary designs. Based upon design preferences, it is understood that the specific components may be rearranged. In some configurations, some components may be omitted, relocated, replaced with equivalent items, or combined with other components without departing from the scope of the present invention. In some configurations, some functions presented as occurring in one component may occur in a different component or be implemented in a different manner. The accompanying claims present elements of the various systems in a sample configuration, and are not meant to be limited to the specific order or hierarchy presented.

It is understood that the specific order or hierarchy of steps in the processes disclosed is an illustration of exemplary approaches. Based upon design preferences, it is understood that the specific order or hierarchy of steps in the processes may be rearranged. In some configurations, some steps may be performed simultaneously. In some configurations, steps may be omitted. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An optics detection system comprising:
    a sensor module configured to illuminate a field of regard with a plurality of light pulses and to capture reflections of the plurality of light pulses in a respective plurality of frames wherein consecutive frames of the plurality of frames at least partially overlap; and
    a processor coupled to the sensor module, the processor configured to process the plurality of frames to locate and identify optics within the field of regard using a plurality of discriminators and to compare the identification of optics identified in the overlapping portions of consecutive frames.

2. The optics detection system of claim 1, wherein the sensor module comprises a plurality of spatially separated illumination sources for illuminating the field of view.

3. The optics detection system of claim 1, wherein the sensor module comprises a preprocessor configured to process the plurality of frames to select portions of the frames containing reflections from within the field of regard for further processing, and
    wherein the processor is configured to process the selected frame portions to locate and identify the optics.

4. The optics detection system of claim 1, wherein each of the plurality of frames comprises an array of pixels, the preprocessor is configured to process columns of pixels to generate strip reports that contain pixels that contain reflections from within the field of regard, and the processor is configured to assemble strip reports into two-dimensional frame portions.

5. The optics detection system of claim 1, wherein the sensor module comprises a spectral filter configured to remove light from the reflections having frequencies outside a frequency band of the plurality of light pulses.

6. The optics detection system of claim 1, wherein the plurality of discriminators includes two or more of the set of peak intensity, spatial distribution of intensity, image size, image shape, image symmetry, and polarization ratio.

7. The optics detection system of claim 1, further comprising:
    a remote system, the remote system comprising:
        a position determination device configured to provide location of the remote system;
        a communication module; and
        a second processor coupled to the position determination device and the communication module, the second processor configured to obtain the location of the remote system from the position determination device, transmit the location of the remote system via the communication module, and receive signals via the communication module containing information about the locations of optics,
    wherein the processor is further configured to calculate relative bearings and distances of optics relative to the remote system.

8. The optics detection system of claim 1, wherein the sensor module comprises:
    a location determination device; and
    an orientation determination device configured to identify the azimuth angle direction of the field of view of the sensor module relative to magnetic north;
    wherein the processor is configured to identify the location of the optics based in part upon the location of the sensor module and compass direction of the field of view of the sensor module.

9. The optics detection system of claim 8, further comprising:
    a communication module coupled to the processor; and a remote system configured to be carried by an individual user and to communicate with the communication module, wherein the remote system comprises a location determination device;

wherein the processor is configured to receive location information from the remote system via the communication module and to transmit via the communication module the locations of optics to the remote system.

10. The optics detection system of claim 1, wherein the sensor module has a field of view that is smaller than the field of regard, the sensor module configured to scan the field of regard in azimuth and elevation.

11. The optics detection system of claim 10, wherein the sensor module has a field of view that is smaller than the field of regard, the sensor module configured to rotatably scan the field of regard.

12. The optics detection system of claim 11, wherein the field of regard encompasses 360 degrees of rotation.

13. The optics detection system of claim 11, wherein the sensor module is configured to rotate horizontally with a vertical field of view of 1 to 10 degrees.

14. The optics detection system of claim 13, wherein the sensor module is configured to index the vertical field of view to cover a larger elevation field of regard.

15. An optics detection system comprising:
a sensor module configured to illuminate a field of regard with a plurality of light pulses and to capture reflections of the plurality of light pulses in a respective plurality of frames, the sensor module comprising a temporal filter synchronized with the light pulses configured to ignore reflections of the plurality of light pulses from objects outside a defined range of distances; and
a processor coupled to the sensor module, the processor configured to process the plurality of frames to locate and identify optics within the field of regard using a plurality of discriminators.

16. The optics detection system of claim 15, further comprising:
a remote system, the remote system comprising:
a position determination device configured to provide location of the remote system;
a communication module; and
a second processor coupled to the position determination device and the communication module, the second processor configured to obtain the location of the remote system from the position determination device, transmit the location of the remote system via the communication module, and receive signals via the communication module containing information about the locations of optics,
wherein the processor is further configured to calculate relative bearings and distances of optics relative to the remote system.

17. An optics detection system comprising:
a remote system, the remote system comprising:
a position determination device configured to provide location of the remote system;
a communication module;
a first processor coupled to the position determination device and the communication module, the first processor configured to obtain the location of the remote system from the position determination device, transmit the location of the remote system via the first communication module, and receive signals via the communication module containing information about locations of optics; and a second processor coupled to a sensor module, which is configured to illuminate a field of regard with a plurality of light pulses and to capture reflections of the plurality of light pulses in a respective plurality frames, the second processor configured to:
process the plurality of frames to locate and identify optics within the field of regard using a plurality of discriminators; and
calculate relative bearings and distances of optics relative to the remote system.

18. A method of detecting optics within a field of regard, the method comprising the steps of:
rotatably scanning the field of regard with a sensor module that illuminates a field of view with a plurality of light pulses, the field of view covering a portion of the field of regard;
capturing reflections of the plurality of light pulses from within the field of view in a respective plurality of frames wherein consecutive frames of the plurality of frames at least partially overlap;
processing the plurality of frames to locate and identify optics within the field of view based on a plurality of discriminators; and
comparing the identification of optics identified in the overlapping portions of consecutive frames.

19. The method of claim 18, wherein the step of capturing reflections comprises the steps of:
receiving light over the field of view for a period of time after the light pulse is projected;
spectrally filtering the received light to block a portion of the light having a frequency outside the bandwidth of the projected light;
temporally gating the received light to ignore reflections from outside a defined range of distances;
splitting the received light with a prism and forming two optical images of the first field of view, the first image formed from light that is co-polarized with a polarization of the projected plurality of light pulses and the second image formed from light that is cross-polarized with the polarization of the projected plurality of light pulses; and
forming a plurality of sequential frames comprising digital images of the reflections of the plurality of light pulses, the frames composed of an array of pixels, each pixel being associated with an azimuth direction and an elevation.

20. The method of claim 18, wherein the step of processing the plurality of frames comprises the steps of:
scanning columns of pixels sequentially across a frame;
identifying the first pixel in a column wherein two of three adjacent pixels have a value that exceeds a threshold value;
extracting a selected number of pixels from the column starting from the identified pixel and storing this set of pixels as a strip report, the strip report being associated with the image and the row and column position of the set of pixels within the image; and
assembling strip reports from adjacent columns of an image into frame portions, the frame portions being associated with a compass direction, elevation angle, and distance.

21. The method of claim 18, further comprising the steps of:
receiving location of a remote system; and
calculating relative bearings and distances of optics relative to the remote system; and transmitting the relative bearings and distances of optics to the remote system.

22. The method of claim 18, wherein the step of processing the plurality of frames comprises the steps of:
measuring the peak intensity of the reflection;
measuring the relative amounts of the reflection that are co-polarized and cross-polarized with the projected light;
measuring the spatial distribution of intensity of the reflection by comparing the peak intensity to the intensities of the pixels that surround the pixel having the peak intensity and calculating a slope;
calculating the image size of the reflection using at least one of the pixel width, height, and area of the reflection and the distance associated of the image;
calculating the image shape of the reflection by comparing the widths of the image in two orthogonal directions;
calculating the image symmetry of the reflection by comparing the centroid of the intensities of the pixels to the geometric center of the image; and
calculating a confidence value by comparing the results of the measurements and calculations performed on the reflection to the results of the same measurements and calculations for the same reflection, as determined by direction, elevation, and range, from images associated with previous pulses of projected light.

23. The method of claim 22, wherein the step of processing the plurality of frames further comprises the step of:
generating one or more confidence values related to a certainty of the optics candidates being threat optics, a certainty of the type of optics, or an urgency or priority rating.

24. The method of claim 18, further comprising the step of reporting possible locations of optics.

25. The method of claim 24, wherein the step of reporting possible locations of optics comprises providing one or more of:
an image showing the locations of the optical sensor and of potential optics;
an image showing the locations of the optical sensor and of individuals or locations;
a distance and bearing of the potential location of optics from the display;
a distance and bearing of the potential location of optics from specific remotely located individuals or locations;
an identification of the type of optics;
a confidence value related to the certainty of the presence of optics;
a confidence value related to the certainty of the type of optics;
the results of the signal processing;
the elapsed time since first detection; and
movement of the location of potential optics over time.

26. A non-transitory, computer-readable medium having computer-executable instructions stored thereon for execution by a processor to perform a method of detecting optics, the method comprising:
rotatably scanning the field of regard with a sensor module that illuminates a field of view with a plurality of light pulses, the field of view covering a portion of the field of regard;
capturing reflections of the plurality of light pulses from within the field of view in a respective plurality of frames wherein consecutive frames of the plurality of frames at least partially overlap;
processing the plurality of frames to locate and identify optics within the field of view based on a plurality of discriminators; and
comparing the identification of optics identified in the overlapping portions of consecutive frames.

27. The non-transitory, computer-readable medium of claim 26, the non-transitory, computer-readable medium having computer-executable instructions stored thereon for execution by the processor to perform a method of detecting optics, the method further comprising:
receiving a location of a remote system;
calculating relative bearings and distances of optics relative to the remote system; and
transmitting the relative bearings and distances of optics to the remote system.

28. An optics detection system comprising:
a sensor module having a field of view and configured to rotatably scan a field of regard, the sensor module comprising:
an illuminator configured to illuminate the field of view with a plurality of light pulses having a frequency band and a polarization;
an aperture configured to accept light from within the field of view;
a spectral filter configured to remove light outside of the frequency band of the plurality of light pulses;
a prism configured to separate the reflections of the plurality of light pulses and form a first image that is co-polarized with the polarization of the plurality of light pulses and a second image that is cross-polarized with the polarization of the plurality of light pulses;
a camera system configured to temporally filter the reflected light to ignore reflections coming from objects that are located outside of a defined range of distances from the camera system, capture the co-polarized and cross-polarized images in a plurality of frames, pre-process the plurality of frames to select portions of the frames containing reflections within the field of regard for further processing, and transmit the selection portions of the frames;
a first position determination device configured to determine the position of the sensor module;
an orientation determination device configured to determine compass direction orientation of the sensor module field of view; and
a first communication module coupled to the camera system, the position determination device, and the orientation determination device, configured to transmit the selected portions of the frames and the position and orientation of the sensor module;
a base station comprising:
a display;
a second communication module configured to communicate with the sensor module; and
a first processor coupled to the second communication module and the display, the first processor configured to:
receive via the second communication module the selected portions of the frames and the position and orientation of the sensor module;
process the plurality of frames to identify optics based on a plurality of discriminators wherein the plurality of discriminators includes two or more of the set of peak intensity, spatial distribution of intensity, image size, image shape, image symmetry, image pattern, and polarization ratio; and display the distance and direction and the type of optics via the display; and a remote system configured to be carried by a remote user, the remote system comprising:
  a second position determination device configured to provide the location of the remote system;
  a third communication module;
  a user interface; and
  a third processor coupled to the second position determination device, third communication module, and user interface, configured to obtain the location from the second position determination device, transmit the location via the third communication module to the base station, receive signals via the third communication module from the base station containing information about the locations of optics, and communicate this information to the user via the user interface; and wherein the base station is further configured to:
  receive the location of warning units via the second communication module;
  calculate the relative bearings and distances of optics relative to the remote system; and
  transmit the relative bearings and distances of optics to the remote system via the second communication module.

* * * * *